US006748083B2

(12) United States Patent
Hughes et al.

(10) Patent No.: US 6,748,083 B2
(45) Date of Patent: Jun. 8, 2004

(54) METHOD AND APPARATUS FOR FREE-SPACE QUANTUM KEY DISTRIBUTION IN DAYLIGHT

(75) Inventors: Richard J. Hughes, Los Alamos, NM (US); William T. Buttler, Los Alamos, NM (US); Steve K. Lamoreaux, Los Alamos, NM (US); George L. Morgan, Jemez Springs, NM (US); Jane E. Nordholt, Los Alamos, NM (US); C. Glen Peterson, Los Alamos, NM (US); Paul G. Kwiat, Champaign, IL (US)

(73) Assignee: The Regents of the University of California, Los Alamos, NM (US)

( * ) Notice: Subject to any disclaimer, the term of this patent is extended or adjusted under 35 U.S.C. 154(b) by 636 days.

(21) Appl. No.: 09/844,176

(22) Filed: Apr. 27, 2001

(65) Prior Publication Data

US 2001/0055389 A1 Dec. 27, 2001

Related U.S. Application Data

(60) Provisional application No. 60/200,305, filed on Apr. 28, 2000.

(51) Int. Cl.[7] .............................. H04K 1/08; G06F 1/02; G06F 7/58
(52) U.S. Cl. ........................... 380/278; 380/47; 380/54; 380/260
(58) Field of Search ............................... 380/36, 37, 46, 380/47, 54, 256, 260, 278; 708/250, 253, 256

(56) References Cited

U.S. PATENT DOCUMENTS 5,515,438 A * 5/1996 Bennett et al. ............. 380/278

OTHER PUBLICATIONS

D.S. Bethune and W.P. Risk, "An Autocompensating Fiber–Optic Quantum Cryptography System Based on Polarization Splitting of Light" Mar. 2000, IEEE J. Quantum Electronics, vol. 36, No. 3, pp. 340–347.*

* cited by examiner

Primary Examiner—Justin T. Darrow
(74) Attorney, Agent, or Firm—Milron D Wyrick

(57) ABSTRACT

A quantum cryptography apparatus securely generates a key to be used for secure transmission between a sender and a receiver connected by an atmospheric transmission link. A first laser outputs a timing bright light pulse; other lasers output polarized optical data pulses after having been enabled by a random bit generator. Output optics transmit output light from the lasers that is received by receiving optics. A first beam splitter receives light from the receiving optics, where a received timing bright light pulse is directed to a delay circuit for establishing a timing window for receiving light from the lasers and where an optical data pulse from one of the lasers has a probability of being either transmitted by the beam splitter or reflected by the beam splitter. A first polarizer receives transmitted optical data pulses to output one data bit value and a second polarizer receives reflected optical data pulses to output a second data bit value. A computer receives pulses representing receipt of a timing bright timing pulse and the first and second data bit values, where receipt of the first and second data bit values is indexed by the bright timing pulse.

14 Claims, 6 Drawing Sheets

Free-space QKD: system overview

| Alice's bit value | 1 | 0 | 1 | 0 |
|---|---|---|---|---|
| Alice's polarization | +45° | V | +45° | V |
| Bob's polarization | −45° | −45° | H | H |
| Bob's bit value | 0 | 0 | 1 | 1 |
| Bob's results | N | N | Y | N |

METHOD AND APPARATUS FOR FREE-SPACE QUANTUM KEY DISTRIBUTION IN DAYLIGHT

The present invention relates to a Provisional Application, Ser. No. 60/200,305, filed on Apr. 28, 2000.

STATEMENT REGARDING FEDERAL RIGHTS

This invention was made with government support under Contract No. W-7405-ENG-36 awarded by the U.S. Department of Energy. The government has certain rights in the invention.

BACKGROUND OF THE INVENTION

Quantum cryptography is an emerging technology in which two parties may simultaneously generate shared, secret cryptographic key material using the transmission of quantum states of light. The security of these transmissions is based on the inviolability of the laws of quantum mechanics and information theoretically secure post-processing methods. An adversary can neither successfully tap the quantum transmissions nor evade detection, owing to the Heisenberg uncertainty principle.

Two of the main goals of cryptography (encryption and authentication of messages) can be accomplished, with provable security, if the sender ("Alice") and recipient ("Bob") possess a secret random bit sequence known as "key" material. The initial step of key distribution, in which the two parties acquire the key material, must be accomplished with a high level of confidence that a third party ("Eve") cannot acquire even partial information about the random bit sequence. If Alice and Bob communicate solely through classical messages, it is impossible for them to generate a certifiably secret key owing to the possibility of passive eavesdropping. However, secure key generation becomes possible if they communicate with single-photon transmissions using the emerging technology of quantum cryptography, or more accurately, quantum key distribution (QKD). A small amount of shared secret key material is required to perform initial authentication. See, e.g., U.S. Pat. No. 5,966,224, issued Oct. 12, 1999, to Hughes, et al., incorporated herein by reference.

The security of QKD is based on the inviolability of the laws of quantum mechanics and provably secure (information theoretic) public discussion protocols. Eve can neither "tap" the key transmissions owing to the indivisibility of quanta nor copy them faithfully because of the quantum "no-cloning" theorem. At a deeper level, QKD resists interception and retransmission by an eavesdropper because in quantum mechanics, in contrast to the classical world, the result of a measurement cannot be thought of as revealing a "possessed value" of a quantum state. A unique aspect of quantum cryptography is that the Heisenberg uncertainty principle ensures that if Eve attempts to intercept and measure Alice's quantum transmissions, her activities must produce an irreversible change in the quantum states (she "collapses the wavefunction") that are retransmitted to Bob. These changes will introduce an error rate having a high number of anomalies in the transmissions between Alice and Bob, allowing them to detect the attempted eaves-dropping. In particular, from the observed error rate Alice and Bob can put an upper bound on any partial knowledge that an eavesdropper may have acquired by monitoring their transmissions. This bound allows the intended users to apply conventional information theoretic techniques by public discussion to distill an error-free, secret key.

Because it has the ultimate security assurance of a law of nature, quantum cryptography offers potentially attractive "ease of use" advantages over conventional key distribution schemes: it avoids the "insider threat" because key material does not exist before the quantum transmissions take place; it replaces cumbersome conventional key distribution methods whose security is based on the physical security of the distribution process; and it provides a secure alternative to key distribution schemes based on public key cryptography, which are potentially vulnerable to algorithmic advances and improved computing techniques. Thus, quantum key distribution enables "encrypted communications on demand," because it allows key generation at transmission time over an unsecured optical communications link.

The first quantum key distribution protocol was published by Charles Bennett and Gilles Brassard in 1984 and is now known as "BB84". A further advance in theoretical quantum cryptography took place in 1991 when Ekert proposed that Einstein-Podolsky-Rosen (EPR) "entangled" two-particle states could be used to implement a quantum cryptography protocol whose security was based on Bell's inequalities. Starting in 1989, Bennett, Brassard and collaborators performed the first experimental demonstration of QKD by constructing a working prototype system for the BB84 protocol using polarized photons. Although the propagation distance was only about 30 cm, this experiment is in several ways still the most thorough demonstration of quantum cryptography.

Potentially practical applications of QKD, outside the carefully controlled environment of a physics laboratory, are largely determined by the physics of single-photon production, the requirement of faithful transmission of the quantum states involved, the existence of high-efficiency single-photon detectors at the required wavelengths, and the compatibility of QKD with existing optical communications infrastructures. In 1992 Bennett published a "minimal" QKD scheme ("B92") and proposed that it could be implemented using single-photon interference with photons propagating for long distances over optical fibers. Since then, several experimental groups have developed optical fiber-based QKD systems.

For example, Los Alamos National Laboratory has demonstrated the feasibility of low-error rate QKD over underground optical fibers that were installed for network applications. QKD was demonstrated over 24 km of fiber and operated for over one year at an increased propagation distance of 48 km. In recent years there have also been considerable developments in the use of free-space laser communications for high-bandwidth terrestrial, surface-to-satellite, satellite-to-satellite, and (potentially) deep space communications.

The optical pointing, acquisition and tracking techniques developed for laser communications can be used to make QKD possible over line-of-sight transmissions in free-space, provided that signal-to-noise and bit rates adequate for cryptographic applications can be achieved. There are certain key distribution problems for which free-space QKD would have definite practical advantages. For example, it is impractical to send a courier to a satellite when new cryptographic key material is needed. We believe that free-space QKD could be used for key generation between a low-earth orbit satellite and a ground station, as well as in other applications where laser communications are possible.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes apparatus for securely generating a key to be used for secure transmission between a sender and a receiver connected by an atmospheric transmission link. A first laser outputs a timing bright light pulse; a second laser outputs a first polarized optical data state; and a third laser for outputting a second polarized optical data state. A random bit generator randomly enables either the second laser or the third laser. Output optics transmit output light from the first, second, and third lasers that is received by receiving optics. Once inside the receiver, a first beam splitter receives light from a receiving telescope, where a received bright light pulse is directed to a delay circuit for establishing a timing window for receiving light from the second or third lasers and where an optical data pulse from either the second or third laser has a probability of being either transmitted by the beam splitter or reflected by the beam splitter. A first polarizer receives optical data pulses transmitted by the beam splitter and, if the data pulse is transmitted through the polarizer and detected, one data bit value is recorded. A second polarizer receives optical data pulses reflected by the beam splitter and if transmitted by the polarizer and detected, produces a second data bit value. A computer receives pulses representing receipt of a bright timing pulse and the first and second data bit values, where receipt of the first and second data bit values is indexed by the bright timing pulse.

In another aspect of the present invention and in accordance with its objectives and purposes apparatus for securely generating a key to be used for secure transmission between a sender and a receiver connected by an atmospheric transmission link, comprises at least one first laser for outputting timing bright light pulses, with second and third lasers for outputting first and second polarized optical data states, and fourth and fifth lasers for outputting third and fourth polarized optical data states. A random bit generator randomly enables either the second and third lasers or the fourth and fifth lasers. Output optics are effective to transmit output light from the first, second, third, fourth and fifth lasers to receiving optics that are effective to receive output light of the output optics from the first, second, third, fourth and fifth lasers. A first beam splitter receives light from the receiving optics, where a received bright light pulse is directed to a delay circuit for establishing a window for receiving light from the second, third, fourth or fifth lasers and where an optical data state from either the second, or third, or fourth or fifth laser has a probability of being either transmitted by the beam splitter or reflected by the beam splitter. A first polarizer receives transmitted optical data states to output one data bit value, and a second polarizer receives reflected optical data states to output a second data bit value. A computer receives pulses representing receipt of a bright timing pulse and the first and second data bit values, where receipt of the first and second data bit values is indexed by the bright timing pulse.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1 is a table illustrating a four-bit example of B92 quantum key distribution. (H refers to horizontal polarization and V refers to vertical.) Results represent a possible scenario where Bob receives only one of two possible (polarization state set by Alice is not orthogonal to that set by Bob) data pulse bits. In fact Bob will receive on average only 50% of the possible data pulses.

FIG. 4 illustrate a raw sample of bits identified by Alice and Bob as shared using the B92 protocol over a 0.5-km daylight path.

DETAILED DESCRIPTION

Figure 2:
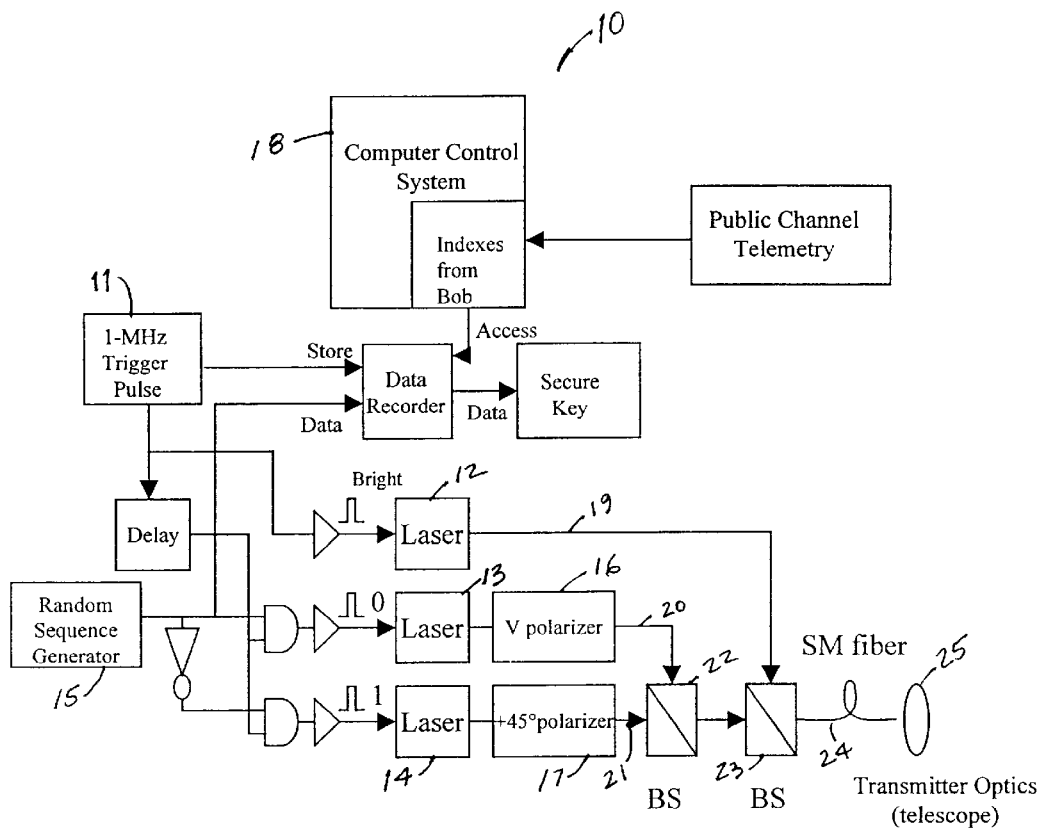
FIG. 2 is a block diagram of a QKD transmitter ("Alice") in accordance with one embodiment of the present invention useful with the B92 protocol.

To understand QKD, it is helpful to first move away from the traditional key distribution metaphor of Alice sending particular key data to Bob. Instead, consider a more symmetrical starting point, in which Alice and Bob initially generate their own, independent random binary sequences, containing more numbers than they need for the key material that they will ultimately share. Through public discussion they agree on a QKD protocol by which they can perform a bitwise comparison of their sequences using a quantum transmission (over a "quantum channel") and a public discussion of the results (over an authenticated public channel) to distill a shared, random subsequence, which will become the key material. It is important to appreciate that they do not need to identify all of their shared numbers, or even particular ones, because the only requirements on the key material are that the numbers should be secret and random. Several QKD protocols have been developed, but for simplicity the minimal B92 QKD protocol is described in terms of the preparation and measurement of single-photon polarization states. Cryptographically, the BB84 protocol has certain advantages, but the physics issues involved are identical with B92.

In the B92 QKD protocol, Alice can produce photons with either of two non-orthogonal linear polarizations: vertical (V) or, e.g. +45°; and Bob can make either of two complementary non-orthogonal polarization measurements: −45°, e.g., or horizontal (H). Alice and Bob generate their own independent sequences of random binary numbers. Next, they proceed through their sequences bit-by-bit in synchronization, with Alice preparing a polarized photon for each of her bits according to the rules:

"0"↔V

"1"↔+45°       (1)

Alice sends each photon over a "quantum channel" to Bob. The quantum channel is a transmission medium that isolates the quantum state from interactions with the "environment", e.g., an optical fiber or a transmission "window" in the atmosphere where there are low losses and high fidelity in transmission of the wavelength of photon used. Bob makes a polarization measurement on each photon he receives, according to the value of his bit as given by:

"0"↔−45°

"1"↔H  (2)

and records the result ("pass"=Y, "fail"=N). Note that Bob will never record a "pass" (a false positive) if his bit is different from Alice's (they have crossed polarizers). He only records a "pass" on 50% of the bits that they have in common. In FIG. 1, the example of four bits is shown. For the first and fourth bits, Alice and Bob had different bit values, so that Bob's result is a definite "fail" in each case. However, for the second and third bits, Alice and Bob have the same bit values and the protocol is such that there is a probability of 0.5 that Bob's result will be a "pass" in each case. Of course, one cannot predict in any particular experiment, which one will be a "pass," but in this example the second bit was a "fail" and the third bit was a "pass."

To complete the protocol Bob sends a copy of his (Y or N) results to Alice, but not the measurement that he made on each bit. It is at this data-reconciliation stage that the initial key material is required for authentication. This key material can be replaced by a portion of the key material generated by QKD. He may send this information over a conventional (public) channel that may be subject to eavesdropping. Now Alice and Bob retain only those bits for which Bob's result was "Y," and these bits become the shared key material. In the example of FIG. 1, the third bit becomes the first bit of the shared key. An ideal B92 procedure distills on average one shared bit from every four initial bits, assuming that there are no photon losses in transmission or detection. The 25% efficiency, $\eta_Q$, of the idealized QKD process is the price that Alice and Bob must pay for secrecy. In a practical system, additional losses in transmission (efficiency factor $\eta_T$) and detection (efficiency factor $\eta_D$) will occur and can be tolerated. However, these losses only affect the bit rate, not the security.

In a practical system, there will be errors in the reconciled data arising from optical imperfections and detector noise, which must be removed before the key material can be used. Alice and Bob can remove these errors using conventional error correcting codes over their public channel, but at the expense of revealing some information (e.g. parity) about the resulting key material to Eve. Errors and information leakage also will occur if Eve performs her own measurement of Alice's states on the quantum channel and fabricates new photons to send on to Bob. To take an extreme case, if Eve measures each of Alice's photons using Alice's basis, she will introduce a 25% error rate into Alice and Bob's key material, while correctly identifying 75% of Alice's bits. Of course, Alice and Bob could readily detect such a large error rate and would not then use their reconciled data for key material. However, the eavesdropper could still gain some information at the expense of a proportionately smaller error rate if she only measures a fraction of Alice's photons.

It is the goal of quantum cryptography for Alice and Bob to translate an observed error rate into an upper bound on Eve's knowledge of their reconciled data. Such bounds have been established for eavesdropping attacks on individual bits and are the subject of current research in the case of coherent attacks on multiple bits. Error correction should then be followed by a further stage of "privacy amplification" to reduce any partial knowledge acquired by Eve to less than one bit of the final key string. For example, if Alice and Bob reveal the parities of random subsets of their error corrected data they can then agree to drop one bit from each subset, e.g. the last bit. Eve does not know whether the dropped bit was a one or a zero and Eve will be forced to have less than one bit of information about the resulting key. These additional stages are performed over the public channel.

Authentication of the public channel transmissions is necessary to avoid a "man-in-the-middle" attack, in which Eve could gain control of both the quantum and public channels, allowing her to masquerade as Bob to Alice or vice-versa. Alice and Bob would then unknowingly generate independent keys with Eve who could use these keys to read all of their subsequent encrypted communications. Alice and Bob need a short, secret authentication key to start the QKD procedure, and can replenish this key with a small portion of the QKD material generated. For authentication based on random hashing, they will need $O(\log_2 n)$ secret authentication bits for every n-bit public transmission.

So from the foregoing, a QKD procedure may be broken down into the following seven stages:

1. Alice and Bob acquire a secret authentication key;
2. Alice and Bob generate independent secret sequences of random bits;
3. Alice and Bob use the quantum transmissions of a QKD protocol to compare their sequences and classical communications to identify a random subsequence of shared secret bits;
4. Alice and Bob perform an error correction procedure on the data;
5. Alice and Bob assess (from the error rate) how much knowledge Eve may have acquired;
6. Alice and Bob perform an appropriate privacy amplification procedure over the public channel;
7. Part of the resulting key material is used to replenish the authentication bits required in step 1, so that the system is ready for the next key generation session.

The result of these steps is a shared, error-free secret key. It has been proposed that the key bits generated by QKD should be used for the encryption of communications using the unbreakable "one-time pad" method. However, the key material could equally well, and more practically, be used by Alice and Bob in any other symmetric key cryptosystem.

In the simple form described above, the B92 protocol is vulnerable to Eve measuring Alice's photons in Bob's basis and only sending on those photons she can identify. (A "Bob's basis" attack.) This will cause a factor of four reduction in bit rate unless Eve sends out multiple photons instead of just one. Alice and Bob can protect against this type of attack if Bob is able to detect the photon number of the received bits, as described below for the present invention. They could also avoid this problem entirely by using the BB84 protocol, which uses four states instead of two. However, from the perspective of the physics, the B92 and BB84 protocols are so similar that BB84 also will be possible under conditions for which QKD with the B92 protocol is feasible.

In considering possible eavesdropping on a QKD system, it is also important to distinguish between attacks that are possible with existing technology, which are limited to individual bit attacks, and potential future attacks that are limited only by the laws of physics. In particular, current QKD experiments use approximate single-photon states that are obtained by attenuating the output of a pulsed laser so that the average photon number per pulse is less than one.

Such pulses contain a Poisson distribution of photon numbers, and the low intensity is necessary to ensure that very few pulses are vulnerable to an eavesdropper using an optical beamsplitter to "tap out" a photon from pulses containing more than one photon. Present QKD systems can be made secure against such attacks by appropriate use of privacy amplification. However, as quantum-optical technology advances, an eavesdropper could use more sophisticated methods to attack such a system in the future, as discussed below. Before such attacks become possible it will be important for Alice and Bob to replace their weak laser pulse QKD source with a true single-photon light source. Several techniques are now becoming feasible for producing such states of light. A demonstration of the feasibility of QKD with weak laser pulses also implies the viability of QKD with a true single-photon light source under the same experimental conditions, because of the linearity of the processes involved.

The success of QKD over free-space optical paths depends on the transmission and detection of single optical photons against a high background through a turbulent medium. Although these are challenging problems they can be overcome with careful choices of experimental parameters and the use of various optical techniques developed for laser communications. The atmosphere has a high transmission "window" for light with a wavelength in the vicinity of 770 nm. Photons can be readily produced at this wavelength with rugged, low-power semiconductor lasers and their polarization properties controlled with off-the-shelf optical components. Furthermore, commercial single-photon counting modules (SPCMs) are now available that can count such photons with efficiencies as high as $\eta_D \sim 65\%$ at rates of up to 1 MHz, with dark count rates as low as 50 Hz.

The atmosphere is essentially non-birefringent at these wavelengths and so will allow the faithful transmission of the QKD polarization states. However, atmospheric turbulence will introduce both photon arrival time jitter and beam wander through variations in refractive index. The slow turbulence time-scales involved (0.1 s to 0.01 s) allow the jitter to be compensated by transmitting a bright timing laser pulse (which carries no key information) at a different wavelength a short time (e.g., 100 ns) before each QKD photon. The arrival of this bright pulse at the receiver allows a definite timing window to be imposed for the single QKD photon's arrival, because the atmospheric transmission time will not have changed over the intervening short interval. Beam wander caused by atmospheric turbulence reduces the QKD bit rate, but is not a critical limitation on surface-to-satellite paths, even if left uncontrolled. However, active beam steering ("tip-tilt" control) methods have been developed for laser communications to keep the beam directed onto the receiver. For example, by monitoring a reflected component of the bright timing pulse, an error signal can be derived and fed back to a beam-steering mechanism.

At first sight, a more serious concern is that the large background of photons from the sun (or even the moon at night) could swamp the single-photon QKD signal. However, a combination of (sub)-nanosecond timing, narrow wavelength filters and a small solid angle for photon acceptance (spatial filtering) at the receiver can render this background tractable.

Referring now to FIG. 2, in an embodiment intended for B92 applications, it can be seen that the QKD transmitter 10, "Alice," in the system shown contains a 1-MHz clock 11 that synchronizes the various events. On each "tick" of 1-MHz clock 11, a ~1-ns optical "bright pulse" is produced from "timing-pulse" laser 12 operating at a wavelength of ~768 nm. Laser 12 may consist of several lasers in order to achieve an adequate level of brightness. After a ~100-ns delay, one of two temperature-controlled diode data lasers 13, 14, enabled by random sequence generator 15, emits a ~1-ns optical pulse that is attenuated to the single-photon level and constrained by interference filters to a wavelength of 773.0±0.5 nm. The polarization of the optical pulse from each data laser 13, 14 is set to one of the two non-orthogonal settings required for the B92 protocol by V polarizer 16 and +45° polarizer 17. The choice of which data laser 13, 14 fires is determined by random sequence generator 15 using a random bit value that is obtained by discriminating electrical noise. The random bit value is indexed by the clock 11 tick and recorded in the memory of computer control system 18. All three optical pulse paths 19, 20, 21 are combined using beam splitters 22, 23, and directed into single-mode (SM) optical fiber 24 for delivery to transmitting beam expander 25, and emitted towards Bob's receiver. An single-photon counting module (SPCM) (not shown in FIG. 2) fiber-coupled to one of the beam splitter 22, 23 output ports monitors the average photon number. The process is then repeated one microsecond later with the next random bit, and so on.

Figure 3:
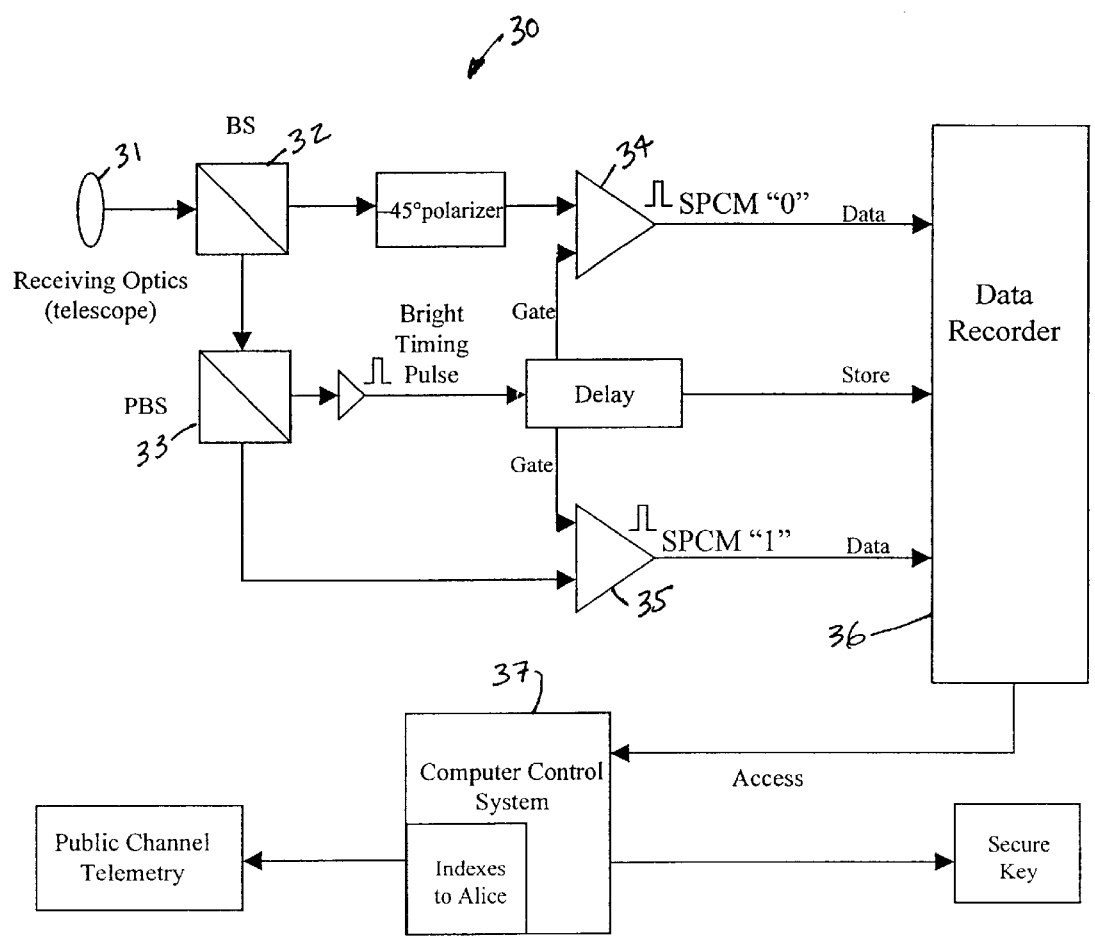
FIG. 3 is a block diagram of a QKD receiver ("Bob") in accordance with one embodiment of the present invention.

Referring now to FIG. 3, it can be seen that at Bob's QKD receiver 30 the light pulses from QKD transmitter 10 (FIG. 2) are collected by 3.5-inch diameter Cassegrain collection telescope 31 and directed into a polarization analysis and detection system. The transmitted bright pulse triggers an avalanche photodiode detector (not shown), and this event sets up an electronic timing "window" about 5-ns long in which a QKD optical data pulse is expected. After emerging from collection telescope 31, an optical data pulse encounters an optical beamsplitter 32 at which a single-photon would be either transmitted or reflected with equal probabilities. This quantum-mechanically random behavior at optical beamsplitter 32 is used to perform Bob's random choice of which B92 polarization measurement is made on the arriving optical data pulse. Along the transmitted path, an optical data pulse's polarization is analyzed according to Bob's B92 "0" value, while along the reflected path a measurement for H-polarization is made using polarizing beamsplitter 33. Polarizing beam splitter 33 transmits H-polarization but reflects V-polarization. After each polarization analysis stage, optical data pulses pass through interference filters matched to those in QKD transmitter 10 (FIG. 2), and are collected into (spatial filtering) multi-mode optical fibers for delivery to single-photon counting modules (SPCMs) 34, 35, one for each bit value. Of course, for many of the arriving bright pulses there will be no corresponding single-photon detection owing to the efficiency of the B92 protocol, the attenuation experienced by the optical data pulses, and the detection efficiency of SPCMs 34, 35. For events on which one of the two SPCMs 34, 35 triggers, Bob can assign a bit value to Alice's transmitted bit. He records these detected bits using data recorder 36 and the memory in computer control system 37, indexed by the "bright pulse" clock tick. Subsequently, Bob's computer control system 37 transmits a file of index values (but not the corresponding bit values) to Alice over a wireless Ethernet link. Alice and Bob then use those detected bits as the raw bit sequences from which an error-free, secret key is distilled using further communications over the Ethernet channel.

The QKD system was operated for several days over a 0.5-km horizontal outdoors atmospheric range from west (transmitter) to east (receiver) under daylight and nighttime conditions. A typical sample of 256 bits identified from 50,000 initial bits under daylight conditions on Nov. 19, 1998 at 4.30 pm, is shown in FIG. 4, with Alice's bit value marked as "A" and Bob's as "B".

The data set shown in FIG. 4 contains 5 errors (marked in bold type) and the bit error rate (BER) observed in the whole data set was approximately 1.6%. This would be regarded as unacceptably high in any conventional telecommunications application, but can be tolerated in QKD because of the value of secret bits. The effectiveness of the precise timing, wavelength and spatial filtering techniques of the present invention for mitigating daylight background photon events is shown by the measured background rate of 1 event per 50,000 detector triggers, contributing only approximately 0.4% to the BER. Detector dark noise makes an even smaller contribution of approximately 0.1% to the BER. The dominant contribution to the BER is from optical misalignment and intrinsic imperfections of the polarizing elements.

Clearly, errors must be removed before the bit strings can be used as key material. There is an efficient, interactive error correction procedure that can remove all errors from such data sets, with BERs of up to 15%. However, for simplicity in the present system, a two-dimensional block-parity error correction procedure is performed over the Ethernet channel, which requires Alice to reveal some parity data about the bit strings. An eavesdropper could combine this information with any knowledge acquired through eavesdropping on the quantum transmissions. There are two ways of dealing with this issue. Alice and Bob could encrypt the parity information, which would require them to have more secret bits initially, or they could perform additional privacy amplification to compensate for the information revealed, which would produce a shorter key string. A rudimentary privacy amplification procedure is performed by dropping one row and one column from each matrix of data bits. A fully functional QKD system would incorporate a more sophisticated privacy amplification procedure.

The ~5-kHz key rate is adequate for the one-time pad encryption of small image files that are incorporated into the present software control system. Because the one-time pad method requires as many key bits as message bits, this key rate would not be adequate for more lengthy transmissions. This key rate would be acceptable and better used for generating session keys for use in other symmetric key cryptosystems because such keys need only be a few hundred bits in length. For example, Alice could encrypt a message, P, using an encryption algorithm, E, that depends on a secret key parameter, K, producing a ciphertext, $C=E_K(P)$, which she transmits to Bob. When Bob receives C he can invert the encryption process if he also knows K to produce the original message: $P=E_K^{-1}(P)$.

The average photon number per optical data pulse for this data set was ~0.3, giving a probability of 22% that the pulse contains exactly one photon, and a probability of 25.9% that a pulse contains at least one photon. Thus, approximately 15% of the detectable pulses contain more than one photon. Such multi-photon pulses can trigger both of Bob's SPCMs 34, 35 (FIG. 3), but the rate for these "dual fire" errors is reduced below the key rate by the product of the BER and the multi-photon emission probability. No dual fires were observed in the entire 50-k bit sequence leading to the data in FIG. 4. By monitoring the dual-fire rate, Alice and Bob could protect against the "Bob's basis" attack outlined above. So, a full security analysis of the present system must take into account the possibility of Eve performing a beam-splitting attack to "tap off" the occasional photon from two-photon pulses. With appropriate privacy amplification procedures the present system can be rendered secure against this and other individual bit attacks that are possible with existing technology.

In the future however, a system such as the present system could become vulnerable to a so-called QND attack, in which Eve uses a quantum non-demolition (QND) measurement to identify those pulses containing two photons. She could then determine Alice's bit value on these pulses, suppress the other pulses, and transmit a new photon to Bob, using a hypothetical lossless channel. Because Alice's two-photon emission rate is larger than Bob's detection rate in the present system, Bob would not notice a reduction in bit rate in this type of attack. Although the QND attack is not feasible today, this possibility should not be ignored. A true single-photon light source, as discussed above, instead of a weak pulsed laser source will remove this potential vulnerability.

Proof-of-concept QKD demonstrations of the present invention over horizontal terrestrial paths provide strong evidence that surface-to-satellite QKD will be possible. This is because the optical influence of turbulence is the major hurdle to be overcome in surface-to-satellite QKD, and the turbulent effects occur predominantly within the lowest 2 km of the atmosphere. Ground-to-satellite, satellite-to-ground and satellite-to-satellite QKD should all be possible, for both low-earth orbit (LEO) and geostationary satellites.

For illustration, the key generation capability of QKD between a ground station and a LEO satellite (~300 km altitude) in one overhead pass (duration ~8minutes) is estimated. The objective will be to produce multiple new cryptovariables, each of several hundred bits in length. Assume that the QKD transmitter 10 (FIG. 2) is at the ground station and QKD receiver 30 (FIG. 3) is on the satellite. Similar arguments support the viability of satellite-to-ground QKD transmissions, which would have key rate and hardware advantages.

The present QKD system is designed to operate at a wavelength near 770 nm where the atmospheric transmission from surface to space can be as high as 80%. Furthermore, at optical wavelengths the polarized QKD photons can be faithfully transmitted because the depolarizing effects of Faraday rotation in the ionosphere are negligible. Because the atmosphere is only weakly dispersive, a bright timing pulse (which carries no key information) of ~100-ps duration can be used to set a short time window (~1–10 ns) within which to look for the QKD photon. A single QKD-photon arriving ~100 ns after the bright pulse would find that the satellite had moved by less than 0.1 mm.

To estimate the rate at which QKD photons would be detected at the satellite from the ground station transmitter, 20-cm diameter optics were assumed at both the ground transmitter and satellite receiver, leading to a ~1-m diameter diffraction-limited spot size at a 300-km altitude satellite. However, there will be beam-wander owing to atmospheric turbulence, which at night in a high desert location such as Los Alamos, N. Mex. can be 1 to 5 arc seconds. For this analysis, a worst case "seeing" of ~10 times the diffraction limit (i.e. 10 arc seconds of wander) was assumed so that the photon collection efficiency at the satellite is $\sim 10^{-4}$. Thus, with a laser pulse rate of 10 MHz, one photon-per-pulse on average, an atmospheric transmission of ~80%, a 65% detector efficiency and allowing for the 25% intrinsic efficiency of the B92 QKD protocol, a key generation rate of ~250 Hz is feasible. There would be a factor of two higher key rate with the BB84 protocol.

Higher key rates would be possible under more typical seeing conditions. Also, with a simple beam tilt feedback system, as used in laser communications systems, the beam could be locked onto the satellite, increasing the key rate to ~40 kHz. A retro-reflector on the satellite would return a portion of each bright pulse to the transmitter with a ~2 ms delay, which is much shorter than the time-scale of atmospheric turbulence fluctuations. From the ground, the satellite would move through an angle of only ~50 micro radians during this time. It would also be possible to place QKD transmitter 10 (FIG. 2) on the satellite and QKD receiver 30 (FIG. 3) on the ground. Because most of the optical influence of atmospheric turbulence would occur in the final ~2-km of the beam path, a higher key rate would then be possible even without tilt control.

To determine if this key rate is useful, the error rate is also considered. First, errors arising from background photons arriving at the satellite on a nighttime orbit with a full moon and under (poor) 10-arc second seeing conditions are considered. A typical radiance observed at the satellite at the transmission wavelength would then be ~1 mW m$^{-2}$ str$^{-1}$ $\mu$m$^{-1}$ or ~4×10$^{15}$ photons s$^{-1}$ m$^{-2}$ str$^{-1}$ $\mu$m$^{-1}$. Assume that QKD receiver 30 "sees" a solid angle ~ five times the apparent size of the source (i.e., 5 arc seconds) and that there is a 1-nm bandwidth interference filter placed in front of collection telescope 31 (FIG. 3), giving a background photon arrival rate of ~225 Hz with a full moon. For comparison, detector dark counts would be ~50 Hz. However, the single-photon detector would only be triggered by precursor bright pulses impinging on the satellite, giving a detector trigger rate of ~90 kHz (without beam tilt control). With a 1-ns time window applied to the detector, the (fractional) bit error rate (BER) from background photons would therefore be ~5×10$^{-5}$ (full moon). With beam tilt control, the fractional BER from background photons would be ~4×10$^{-5}$. In practice, errors from optical component limitations and misalignments will be larger, amounting to a 1 to 2 percent BER, based on experience.

From this simple analysis using worst-case estimates, it is seen that QKD between a ground station and a low-earth orbit satellite should be possible on nighttime orbits. During the several minutes that a satellite would be in view of the ground station there would be adequate time to acquire the satellite, perform the QKD transmissions for ~1 minute, and produce a minimum of ~10,000 raw bits, from which a shorter error-free key stream of several thousand bits would be produced after error correction and privacy amplification. Under more typical seeing conditions or with beam tilt control implemented, up to 10$^5$ key bits could be produced in the 1-minute QKD transmission. A cryptographically useful quantity of key material could therefore be generated between a ground station and a LEO (or geostationary) satellite using available technology. Satellite to satellite QKD transmissions would also be possible.

On daytime orbits the background radiance would be ~4,000 times larger (~2×10$^{19}$ photons s$^{-1}$ m$^{-2}$ str$^{-1}$ $\mu$m$^{-1}$) than under a full moon, but a narrow atomic vapor filter (~10$^{-2}$ nm filter width) would keep the background photon arrival rate to only ~10 kHz. Assuming a typical daytime seeing of 10 arc seconds, the key rate would be ~250 Hz, and the BER from background photons would then be ~2×10$^{-3}$ (without tilt control). QKD is therefore also likely to be possible on daytime orbits.

Figure 5:
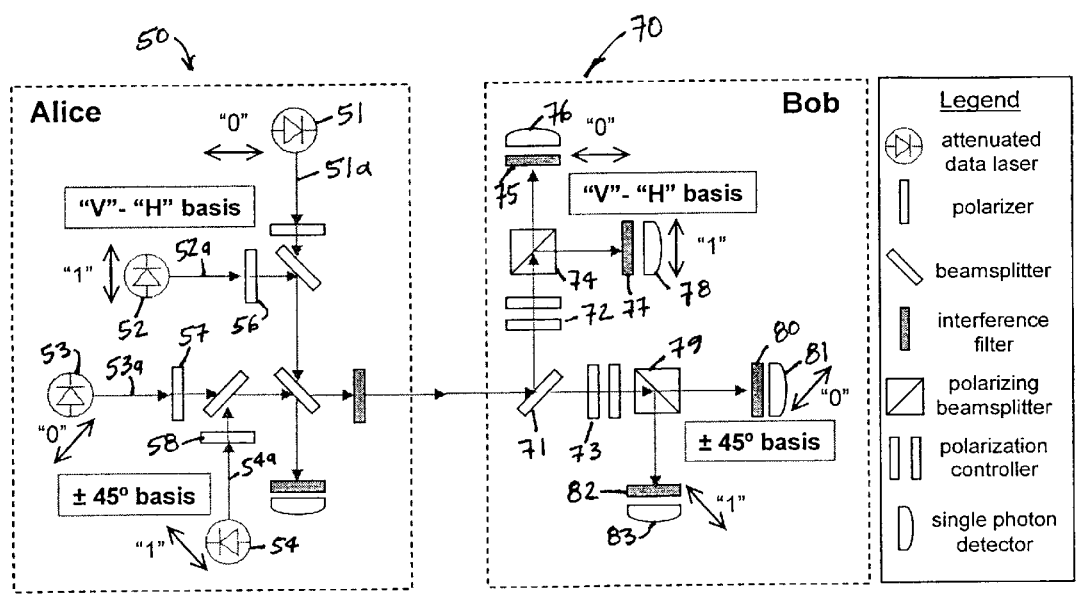
FIG. 5 is a simplified block diagram of a QKD transmitter ("Alice") and QKD receiver ("Bob") in an embodiment of the present invention useful with the BB84 protocol.

Another embodiment of the present invention intended for BB84 applications is illustrated in a simplified block diagram in FIG. 5, with the legend explaining the symbols used. A more complete QKD system for either protocol is described hereafter. In FIG. 5, Alice's QKD transmitter 50 uses a 1 MHz clock 11 (see FIG. 2) to synchronize the various events. On each "tick" of 1 MHz clock 11, an approximate 1-ns optical "bright pulse" is produced from at least one "timing pulse" lasers (not shown) operating at a wavelength of approximately 1,550 nm. The at least one language is used because with currently available lasers, several are necessary to achieve the required brightness.

Approximately 100 ns after the bright timing pulses, one of four temperature controlled "data" diode lasers 51-54 emits an approximate 1-ns optical pulse 51a that is attenuated to the single-photon level in response to one of two random bits generated by a randomizer chip (FIG. 2) that determines which of the two conjugate polarization bases are used for the transmission, either (H,V), or (±45°, −45°). The second bit determines whether a "0" or a "1" is sent, with (0,1)=(H,V) in the first basis, and (0,1)=(+45°, −45°) in the other basis. Single photon pulse 51b is directed through the appropriate polarizer 55, 56, 57 or 58 that sets the proper polarization state for single photon pulse 51b. The polarized single photon pulse 51c is then passed through the appropriate beamsplitter 59, 60 to beamsplitter 61. After leaving beamsplitter 61, polarized single photon pulse 51c is constrained by interference filter 62 to a wavelength of 772.0±0.05 nm and is launched through a spatial filter (not shown) to remove spatial mode information and then through an 8.9-cm Cassegrain telescope (not shown) toward Bob's QKD receiver 70.

A portion of polarized single photon pulses 51c is directed by beamsplitter 61 through interference filter 63 and detected by single photon detector 64. Single photon detector 64 can be a passively-quenched silicon (Si) avalanche photodiode (APD). Single photon detector 64 is used to monitor the outgoing polarized single photon pulses 51c to assure that the optimal secret bit rate is achieved. As previously discussed, this requires that polarized single photon pulses 51c have an average photon number of <1.

At Bob's QKD receiver 70, the 1-nm bright timing pulses at a wavelength of approximately 1550 nm are collected and set up QKD receiver 70 to receive polarized single photon pulses 51c. The polarized single photon pulses 51c from Alice's QKD transmitter 50 are received by beamsplitter 71 and routed to polarization controller 72 and to polarization controller 73.

Depending on the polarization imparted to polarized single photon pulses 51c in Alice's QKD transmitter 50, those with "V" or "H" polarization will proceed through polarization controller 72, and those with ±45° polarization will proceed through polarization controller 73. Those polarized single photon pulses 51c with "V" or "H" polarization then proceed to polarizing beamsplitter 74, where polarized single photon pulses 51c representing a zero ("0") are routed to interference filter 75 and to single photon detector 76. Polarized single photon pulses 51c representing a one ("1") are routed to interference filter 77 and to single photon detector 78.

Polarized single photon pulses 51c having a ±45° polarization are routed to beamsplitter 79 where polarized single photon pulses 51c representing a zero ("0") are routed to interference filter 80 and to single photon detector 81. Polarized single photon pulses 51c that represent a one ("1") are routed to interference filter 82 and to single photon detector 83.

Figure 6:
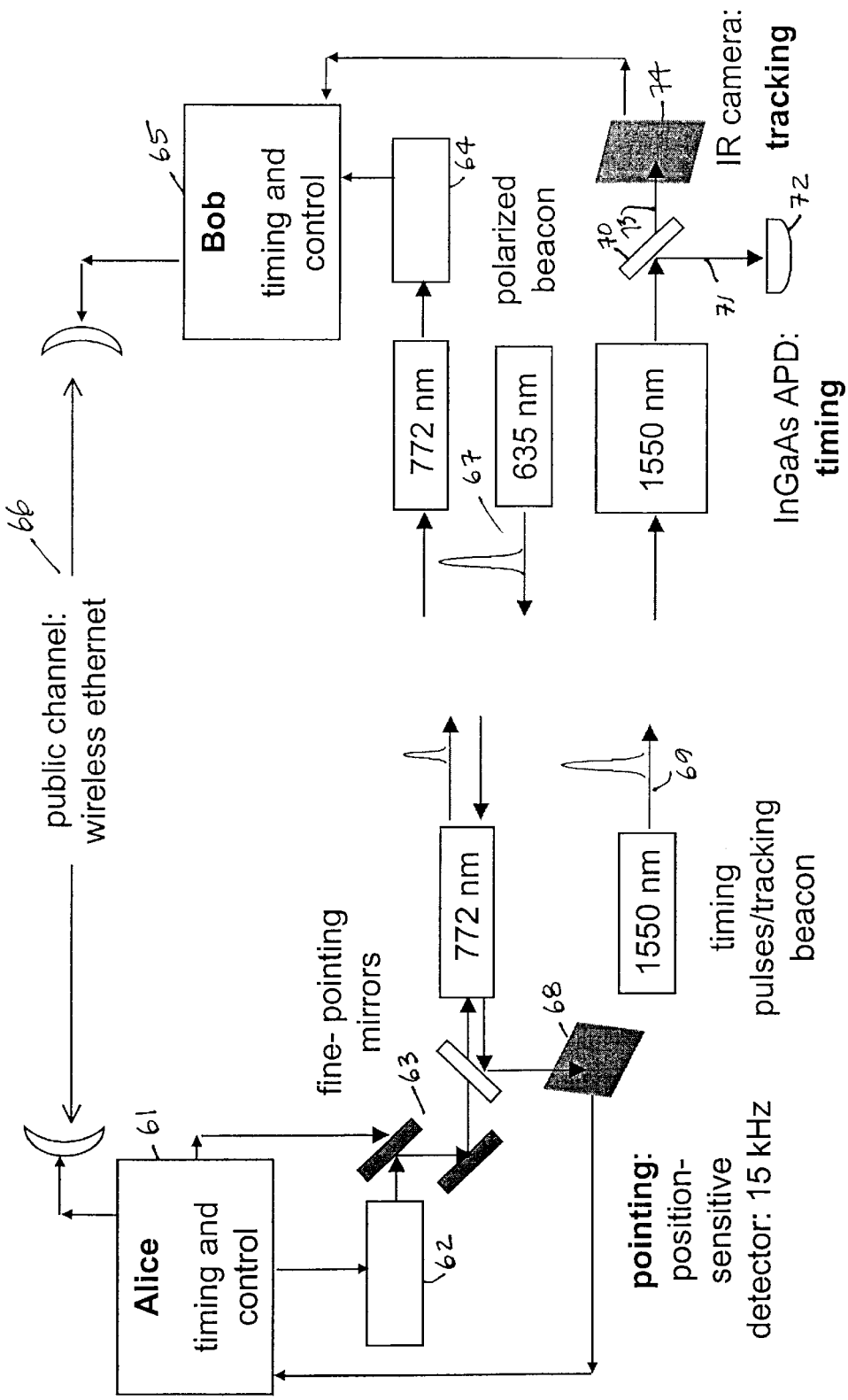
FIG. 6 is a schematical illustration of a QKD system for operation either the B92 or BB84 protocol.

Referring now to FIG. 6, there can be seen a schematical system overview of the free-space QKD system of the present invention indicating the relationships and example wavelengths for the quantum key sharing between Alice and Bob. As shown, timing and control 61 provides the timing and control signals to quantum key transmitter 62 and control signals to fine-pointing mirrors 63. Alice's quantum key transmitter 62 provides its output to fine-pointing mirrors 63 for transmission to Bob at the example wavelength of 772 nm. Alice's quantum key transmitter 62 can be either the B92 QKD transmitter 10 of FIG. 2, or the BB84 QKD transmitter 50 of FIG. 5.

The signals from Alice are received by Bob's QKD receiver 64 and pertinent material previously described are provided to Bob's timing and control 65. Bob and Alice conduct their public channel communication over wireless ethernet system 66. Bob transmits a polarized beacon 67 at an example wavelength of 635 nm to Alice's position-sensitive detector 68 in order to align Alice's quantum key transmitter 62 optics with the optics of Bob's quantum key receiver 64. In addition, Alice transmits timing pulses/tracking beacon 69 to Bob and provided to beamsplitter 70 with timing pulses 71 being routed to avalanche photodiode 72 for system timing, and tracking beacon pulses 73 being routed to IR camera 74. IR camera 74 provides its information to Bob's timing and control 65.

The development of QKD for satellite communications would represent a major step forward in both security and convenience. If the key material supplied at launch should be used up during normal operations or compromised, an issue arises of how to securely re-key a satellite on-orbit. In contrast to conventional key distribution methods whose security is based on assumptions of computational complexity, QKD is a physics-based technique and, as such, needs to be experimentally validated under the conditions of its intended use. The primary physics requirements for this application of QKD, namely the transmission and detection of single photons between a ground station and an airborne or orbital asset, have never been demonstrated. However, many of the optical acquisition, pointing, tracking and adaptive optics techniques developed for laser communications with satellites can be directly applied to this problem.

Satellite QKD could also be used to provide secure key distribution to two ground-based users (Alice and Bob) who do not have access to optical fiber communications and who are not within line-of-sight: they could each generate independent quantum keys with the same satellite, which would then transmit the XOR of the keys to Bob. Bob would then XOR this bit string with his key to produce a key that agrees with Alice's. Alice and Bob could then use their shared key for encrypted communications over any convenient channel. This procedure could extend the security and convenience of QKD to widely separated ground-based users. Since the shared key is developed in real time, there is no concern as with other keys that may be compromised due to their being stored for considerable periods of time.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Apparatus for securely generating a key to be used for secure transmission between a sender and a receiver connected by an atmospheric transmission link, comprising:

at least one first laser for outputting a timing bright light pulse;

a second laser for outputting a first polarized optical data state;

a third laser for outputting a second polarized optical data state;

a random bit generator for randomly enabling either the second laser or the third laser;

output optics effective to transmit output light from the first, second, and third lasers;

receiving optics effective to receive output light of the output optics from the first, second, and third lasers;

a first beam splitter for receiving light from the receiving optics, where a received timing bright light pulse is directed to a delay circuit for establishing a window for receiving light from the second or third lasers and where an optical data state from either the second or third laser has a probability of being either transmitted by the beam splitter or reflected by the beam splitter;

a first polarizer for receiving transmitted optical data states to output one data bit value;

a second polarizer for receiving reflected optical data states to output a second data bit value; and a computer receiving pulses representing receipt of a timing bright light pulse and the first and second data bit values, where receipt of the first and second data bit values is indexed by the timing bright light pulse.

2. The apparatus as described in claim 1 wherein said at least one first laser comprises four first lasers.

3. The apparatus as described in claim 1 wherein said first polarized state comprises H polarization.

4. The apparatus as described in claim 1 wherein said second polarized state comprises ±45° polarization.

5. The apparatus as described in claim 1 wherein said window has a time duration of approximately 1 ns.

6. The apparatus as described in claim 1 wherein said window has a time duration of approximately 10 ns.

7. Apparatus for securely generating a key to be used for secure transmission between a sender and a receiver connected by an atmospheric transmission link, comprising:

at least one first laser for outputting timing bright light pulses;

second and third lasers for outputting first and second polarized optical data states;

fourth and fifth lasers for outputting third and fourth polarized optical data states;

a random bit generator for randomly enabling either the second and third lasers or the fourth and fifth lasers;

output optics effective to transmit output light from the first, second, third, fourth and fifth lasers;

receiving optics effective to receive output light of the output optics from the first, second, third, fourth and fifth lasers;

a first beam splitter for receiving light from the receiving optics, where a received bright light pulse is directed to a delay circuit for establishing a window for receiving light from the second, third, fourth or fifth lasers and where an optical data state from either the second, or third, or fourth or fifth laser has a probability of being either transmitted by the beam splitter or reflected by the beam splitter a first polarizer for receiving transmitted optical data states to output one data bit value;

a second polarizer for receiving reflected optical data states to output a second data bit value; and a computer receiving pulses representing receipt of a bright timing pulse and the first and second data bit values, where receipt of the first and second data bit values is indexed by the bright timing pulse.

8. The apparatus as described in claim 7 wherein said at least one first laser comprises four first lasers.

9. The apparatus as described in claim 7 wherein said first polarized state comprises H polarization.

10. The apparatus as described in claim 7 wherein said second polarized state comprises V polarization.

11. The apparatus as described in claim 7 wherein said third polarized state comprises +45° polarization.

12. The apparatus as described in claim 7 wherein said fourth polarized state comprises −45° polarization.

13. The apparatus as described in claim 7 wherein said window has a time duration of approximately 1 ns.

14. The apparatus as described in claim 7 wherein said window has a time duration of approximately 10 ns.

* * * * *